(12) United States Patent
Gan et al.

(10) Patent No.: US 12,015,235 B2
(45) Date of Patent: Jun. 18, 2024

(54) ALL-FIBER OPTICAL VORTEX LASER BASED ON RESONANCE OF ORBITAL ANGULAR MOMENTUM MODES

(71) Applicant: SOUTH CHINA UNIVERSITY OF TECHNOLOGY, Guangdong (CN)

(72) Inventors: Jiulin Gan, Guangdong (CN); Zhongmin Yang, Guangdong (CN); Xiaobo Heng, Guangdong (CN); Zhishen Zhang, Guangdong (CN)

(73) Assignee: SOUTH CHINA UNIVERSITY OF TECHNOLOGY, Guangzhou (CN)

( * ) Notice: Subject to any disclaimer, the term of this patent is extended or adjusted under 35 U.S.C. 154(b) by 764 days.

(21) Appl. No.: 17/266,114

(22) PCT Filed: Oct. 31, 2018

(86) PCT No.: PCT/CN2018/113244
§ 371 (c)(1),
(2) Date: Feb. 5, 2021

(87) PCT Pub. No.: WO2020/047977
PCT Pub. Date: Mar. 12, 2020

(65) Prior Publication Data
US 2021/0257804 A1    Aug. 19, 2021

(30) Foreign Application Priority Data
Sep. 7, 2018  (CN) .......................... 201811043844.9

(51) Int. Cl.
*H01S 3/00*      (2006.01)
*H01S 3/067*     (2006.01)

(52) U.S. Cl.
CPC ...... *H01S 3/06783* (2013.01); *H01S 3/06712* (2013.01); *H01S 3/06716* (2013.01); *H01S 3/06791* (2013.01)

(58) Field of Classification Search
CPC ............ H01S 3/06783; H01S 3/06712; H01S 3/06716; H01S 3/06791
See application file for complete search history.

(56) References Cited

U.S. PATENT DOCUMENTS 9,103,975 B2 *   8/2015  Yu .......................... G02B 6/124

FOREIGN PATENT DOCUMENTS

| CN | 102148067 | 8/2011 |
| CN | 103487956 | 1/2014 |

(Continued)

OTHER PUBLICATIONS

Zhao et al; All-Fiber Vortex Laser Generated With Few-Mode Long-Period Gratings ; Apr. 15, 2018; IEEE Photonics Letters; vol. 30, No. 8, pp. 752-755.*

(Continued)

*Primary Examiner* — Mark Hellner
(74) *Attorney, Agent, or Firm* — JCIPRNET

(57) ABSTRACT

Disclosed is an all-fiber optical vortex laser based on resonance of orbital angular momentum modes. The all-fiber optical vortex laser has an annular cavity structure, and includes a narrow-linewidth pump laser, an optical amplifier, an orbital angular momentum mode generator, a first polarization controller, an optical fiber circulator, an optical fiber coupler, a second polarization controller and a vortex optical fiber. The orbital angular momentum mode generator (3) realizes directional conversion from a fundamental transverse mode in a single-mode optical fiber into an orbital angular momentum mode with a specific topological charge in a vortex optical fiber. The optical fiber coupler can realize directional coupling from an orbital angular momentum mode in one vortex optical fiber to an orbital angular momentum mode in another vortex optical fiber; the vortex (Continued)

optical fiber is an optical fiber supporting stable transmission of an orbital angular momentum mode.

7 Claims, 2 Drawing Sheets

(56) References Cited

FOREIGN PATENT DOCUMENTS

| | | |
|---|---|---|
| CN | 105071206 | 11/2015 |
| CN | 105870768 | 8/2016 |
| CN | 106575098 | 4/2017 |
| JP | 5254077 | 8/2013 |

OTHER PUBLICATIONS

"International Search Report (Form PCT/ISA/210) of PCT/CN2018/113244," mailed on Jun. 10, 2019, with English translation thereof, pp. 1-4.

* cited by examiner

ALL-FIBER OPTICAL VORTEX LASER BASED ON RESONANCE OF ORBITAL ANGULAR MOMENTUM MODES

CROSS-REFERENCE TO RELATED APPLICATION

This application is a 371 of international application of PCT application serial no. PCT/CN2018/113244, filed on Oct. 31, 2018, which claims the priority benefit of China application no. 201811043844.9, filed on Sep. 7, 2018. The entirety of each of the above mentioned patent applications is hereby incorporated by reference herein and made a part of this specification.

TECHNICAL FIELD

The present invention relates to the technical fields of optical fiber lasers and optical communications, and more particularly, to an all-fiber optical vortex laser based on resonance of orbital angular momentum modes.

BACKGROUND

A vortex beam is an annular hollow beam with spiral phase distribution and zero central intensity, the light field distribution of which contains a phase factor exp(ihp), wherein each photon in the beam carries an orbital angular momentum of 1, and 1 is a topological charge.

Orbital angular momentum modes with different topological charges 1 are orthogonal, which pertain to a new dimension excluding four dimensions including a frequency, an amplitude, a phase and a polarization state of a traditional plane wave. Therefore, to apply the vortex beam in the field of optical communication will greatly improve a capacity and a spectral efficiency of a communication system. In addition, due to unique spatial intensity and phase distribution, the vortex beam has a wide application prospect in the fields of optical fiber sensing, quantum and nanometer optics, optical manipulation, super-resolution imaging and laser material processing, thus attracting more and more interests of people.

Driven by these applications, researchers have proposed a plurality of methods for obtaining optical vortex laser light. At present, the optical vortex laser may be generated by two modes, wherein the first mode refers to a laser carrying out mode conversion based on an extracavity phase optical element, and a structure thereof is mainly composed of a mature optical non-vortex laser and an extracavity phase optical element for conversion of an orbital angular momentum mode, wherein common phase elements include a spiral phase plate, a holographic phase plate, a spatial light modulator, and the like. Such laser is often limited by material characteristics of the phase optical element itself, so that it is difficult to realize an integrated design with a laser resonant cavity. Such laser has a low conversion efficiency and can only preform conversion of a single wavelength, and damage is easily caused to converted element by high-energy laser light. The other mode refers to a optical vortex laser generating vortex beam based on direct oscillation of laser transverse mode selection (Patent Application No.: 201510596176.2), and a main realization form thereof is an annular pump, a point defect mirror or a phase element inserted in a resonant cavity. Such laser is a solid laser containing a body element, and has a complicated laser system, a large cavity loss and a high laser threshold.

Compared with a solid laser of the body element, an all-fiber laser has the advantages such as low cost, good flexibility, good stability, small size, high efficiency and so on. However, there are few reports on an all-fiber optical vortex laser. An optical vortex fiber laser based on mode conversion coupling has been disclosed (Patent Application No.: 201610360609.9), which adopts an all-fiber structure to output vortex laser light, but a fundamental transverse mode, instead of an orbital angular momentum mode, in an optical fiber is still directly resonated in a cavity, and a single-mode optical fiber—few-mode optical fiber coupler inserted into a laser cavity is used as an optical vortex generation and output device. Since a mode generated by the optical fiber coupler is a degenerate linear polarization (LP) mode, it is still necessary to additionally exert a stress and adjust a polarization state to generate the vortex beam. Therefore, the vortex beam generated by the all-fiber laser is completely limited by the single-mode optical fiber—few-mode optical fiber coupler, with a poor beam quality and a low mode purity. In addition, the few-mode optical fiber adopted in that invention cannot support stable transmission of the orbital angular momentum mode, resulting in a poor stability of the generated vortex beam. Therefore, it is of great significance to realize an all-fiber laser solution based on direct resonance of orbital angular momentum modes to obtain the optical vortex laser light with a high purity and a high stability.

SUMMARY

The present invention aims to overcome the defects in the prior art, and provides an all-fiber optical vortex laser based on resonance of orbital angular momentum modes, and based on a Brillouin nonlinear effect, a vortex optical fiber supporting stable transmission of an orbital angular momentum mode is used as a gain medium to realize direct resonance amplification of an orbital angular momentum mode in a cavity, and optical vortex laser light with a high mode purity is directly obtained at an output end of the laser. In addition, the laser also has advantages such as compact structure, simple adjustment, low cost, high stability and so on.

The objective of the present invention is achieved by at least one of the following technical solutions.

An all-fiber optical vortex laser based on resonance of orbital angular momentum modes includes a narrow-linewidth pump laser, an optical amplifier, an orbital angular momentum mode generator, a first polarization controller, an optical fiber circulator, an optical fiber coupler, a second polarization controller and a vortex optical fiber;

wherein the orbital angular momentum mode generator includes a first port, a second port, a third port and a fourth port; the optical fiber circulator includes a first port, a second port and a third port; the optical fiber coupler includes a first port, a second port, a third port and a fourth port; the narrow-linewidth pump laser is connected to the optical amplifier; the optical amplifier is connected to the first port of the orbital angular momentum mode generator, and the second port of the orbital angular momentum mode generator is connected to the first port of the optical fiber circulator via the first polarization controller; the second port of the optical fiber circulator is connected to the first port of the optical fiber coupler; the second port of the optical fiber coupler is connected to the third port of the optical fiber circulator via the second polarization controller and the vortex optical fiber to form an annular cavity; and the third port of the optical fiber coupler outputs laser light.

Preferably, a narrow-linewidth semiconductor laser or a narrow-linewidth optical fiber laser is used as the narrow-linewidth pump laser, which has a linewidth lower than 1 MHz, and is operated in a single longitudinal mode.

Preferably, a high-gain rare earth ion-doped optical fiber amplifier (such as an Er-doped optical fiber amplifier) or a semiconductor optical amplifier in a corresponding wave band is used as the optical amplifier.

Preferably, the orbital angular momentum mode generator is a 2×2 mode selection coupler made by fused biconical tapering of a single-mode optical fiber and the vortex optical fiber, thus realizing directional selection coupling between a fundamental transverse mode in the single-mode fiber and an orbital angular momentum mode with a specific topological charge in the vortex optical fiber, the first and fourth ports are the single-mode optical fibers, and the second and third ports are the vortex optical fibers.

Preferably, the optical fiber circulator is a vortex optical fiber circulator, and tail optical fibers of the three ports are vortex optical fibers.

Preferably, the optical fiber coupler is an intracavity mode coupling device, and is a 2×2 coupler made by fused biconical tapering of the vortex optical fibers, which may realize directional coupling between an orbital angular momentum mode in one vortex optical fiber and an orbital angular momentum mode with a same topological charge in another vortex optical fiber, and tail optical fibers of the four ports are vortex optical fibers.

Preferably, the vortex optical fiber is an optical fiber supporting stable transmission of an orbital angular momentum mode, more than two orbital angular momentum modes are supported, and the length of the vortex optical fiber is greater than 20 m.

The optical vortex laser of the present invention has an annular cavity structure, one optical fiber circulator and one optical fiber coupler are included in the annular cavity, and a connecting optical fiber in the whole annular cavity is the vortex optical fiber. According to the present invention, a stimulated Brillouin scattering effect in the vortex optical fiber is used to realize the resonance amplification of the orbital angular momentum mode in the annular cavity, and stable high-purity vortex laser light is generated at a room temperature.

Compared with the prior art, the present invention has the following advantages and beneficial effects.

1. According to the present invention, the orbital angular momentum mode generator based on the vortex optical fiber is used as a laser resonance extracavity mode conversion device, and the generated orbital angular momentum mode has a high purity, a low loss and a high efficiency.
2. According to the present invention, direct intracavity resonance amplification of the orbital angular momentum mode is realized based on a Brillouin nonlinear gain, and the obtained vortex laser light has a high mode purity.
3. According to the present invention, the vortex optical fiber is used as a gain medium, which may ensure that the orbital angular momentum mode remains stable during resonance.
4. According to the present invention, the all-fiber structure is used, which is simple in structure, low in cost, easy to integrate an optical fiber system, stable in outputting the laser light and narrow in a linewidth, thus improving a practicability and a reliability of the vortex laser light.

Figure 1:
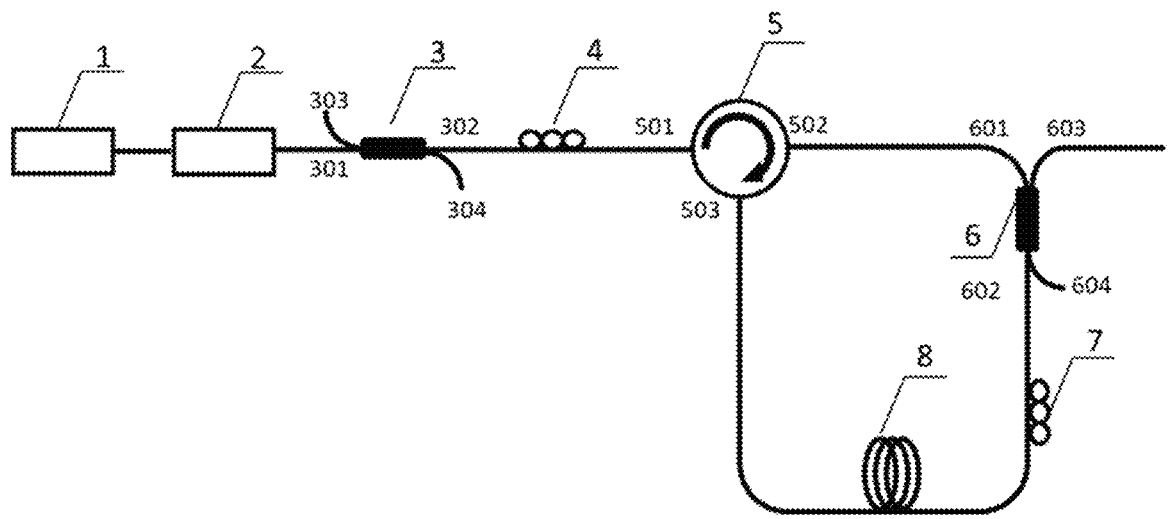
FIG. 1 is a schematic diagram of an all-fiber optical vortex laser based on resonance of orbital angular momentum modes according to an embodiment.

In the drawings, 1 refers to narrow-linewidth pump laser, 2 refers to optical amplifier, 3 refers to orbital angular momentum mode generator, 4 refers to first polarization controller, 5 refers to optical fiber circulator, 6 refers to optical fiber coupler, 7 refers to second polarization controller, and 8 refers to vortex optical fiber.

DETAILED DESCRIPTION

The present invention is further described in detail hereinafter with reference to the embodiments and the accompanying drawings, but the implementation modes of the present invention are not limited to this.

Embodiment 1

As shown in FIG. 1, an all-fiber optical vortex laser based on resonance of orbital angular momentum modes according to the embodiment includes a narrow-linewidth pump laser 1, an optical amplifier 2, an orbital angular momentum mode generator 3, a first polarization controller 4, an optical fiber circulator 5, an optical fiber coupler 6, a second polarization controller 7 and a vortex optical fiber 8.

In the present embodiment, a tunable narrow-linewidth semiconductor laser of C-band power or a narrow-linewidth optical fiber laser is used as the narrow-linewidth pump laser 1, which has a linewidth lower than 1 MHz, and a tail fiber is a single-mode optical fiber.

A high-gain Er-doped optical fiber amplifier or a semiconductor optical amplifier in 1550 nm wave band is used as the optical amplifier 2, and a tail fiber is a single-mode optical fiber.

The orbital angular momentum mode generator 3 is a 2×2 mode selection coupler made by fused biconical tapering of a single-mode optical fiber and the vortex optical fiber, thus may realizes directional selection coupling between a fundamental transverse mode in the single-mode fiber and an orbital angular momentum mode with a specific topological charge in the vortex optical fiber. The first port 301 and the fourth port 304 are the single-mode optical fibers, and the second port 302 and the third port 303 are the vortex optical fibers.

The optical fiber circulator 5 is a vortex optical fiber circulator, and tail optical fibers of the first port 501, the second port 502 and the third port 503 are all vortex optical fibers.

The optical fiber coupler 6 is a 2×2 coupler made by fused biconical tapering of the vortex optical fibers, which may realize directional coupling between an orbital angular momentum mode in a vortex optical fiber and an orbital angular momentum mode with a same topological charge in a vortex optical fiber. A splitting ratio of the first port 601 and the third port 603 is 90:10, a splitting ratio of the second port 602 and the fourth port 604 is also 90:10, and tail fibers of the four ports 601, 602, 603 and 604 are all vortex optical fibers.

The vortex optical fiber 8 is an optical fiber supporting stable transmission of an orbital angular momentum mode in 1550 nm wave band, orbital angular momentum modes with topological charges being +1 and −1 are supported, and a length of the vortex optical fiber 8 is 600 m.

In the present embodiment, power of laser output by the narrow-linewidth pump laser 1 is amplified by the optical amplifier 2, and amplified high-power pump light is injected into the first port 301 of the orbital angular momentum mode generator 3. After passing through the orbital angular momentum mode generator 3, the pump light is converted from a fundamental transverse mode of a single-mode optical fiber in the first port 301 to the orbital angular momentum mode with the specific topological charge (+1 or −1) of the vortex optical fiber in the second port 302 of the orbital angular momentum mode generator 3. The generated pump light of the orbital angular momentum mode is injected into the first port 501 of the optical fiber circulator 5 after passing through the first polarization controller 4, and then injected into the first port 601 of the optical fiber coupler 6 from the second port 502 of the optical fiber circulator 5. After passing through the optical fiber coupler 6, 90% pump light of the orbital angular momentum mode is transmitted in the vortex optical fiber 8 after passing through the second polarization controller 7, thus generating a stimulated Brillouin scattering effect, resulting in reversely transmitted Brillouin Stokes light of the orbital angular momentum mode.

Figure 2:
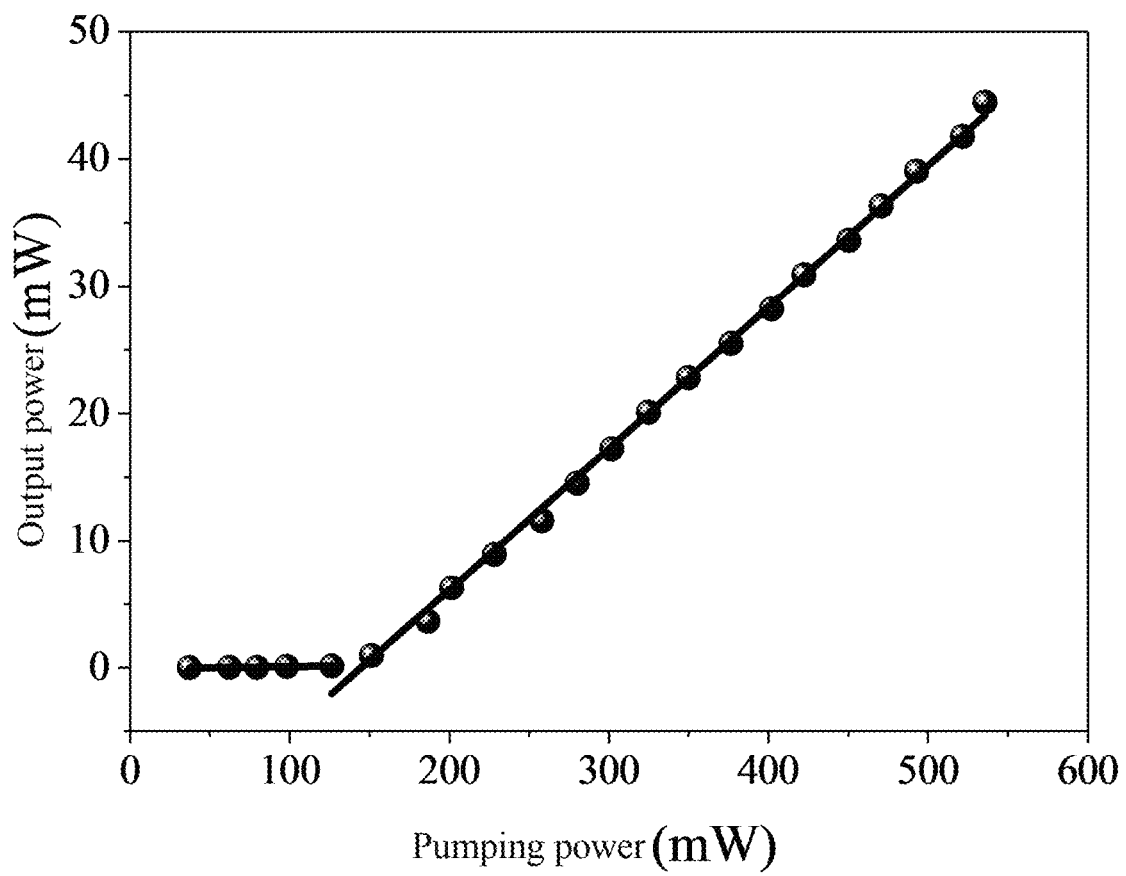
FIG. 2 is a power curve graph of the laser in the embodiment.
Figure 3:
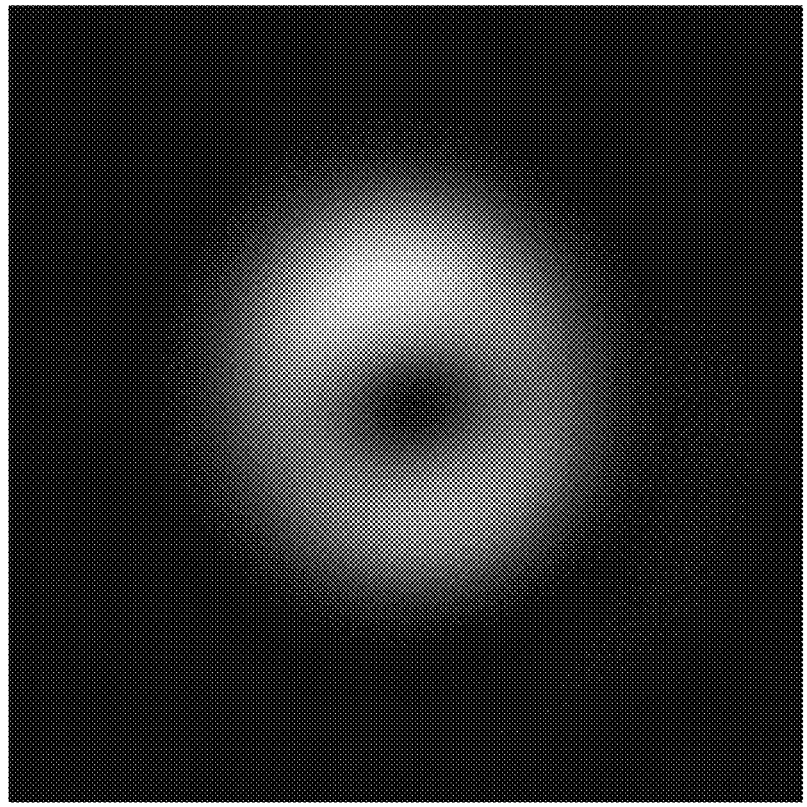
FIG. 3 is a diagram illustrating far-field intensity distribution of output laser light.

When power of the pump light exceeds a Brillouin threshold in an annular cavity, the Brillouin Stokes light generated in the vortex optical fiber 8 enters the vortex optical fiber 8 again after passing through first port 601 of the optical fiber coupler 6, the second port 502 of the optical fiber circulator 5 and the third port 503 of the optical fiber circulator 5 in sequence to form oscillation in a resonant cavity, which means that Brillouin Stokes laser light with a lower order frequency than that of the pump light is generated, and the Brillouin Stokes laser light is output through the third port 603 of the optical fiber coupler 6, which means that the optical vortex laser light is obtained. The power curve graph of the laser is shown in FIG. 2, and the far-field intensity distribution of the generated vortex laser light is shown in FIG. 3.

The first polarization controller 4 between the second port 302 of the orbital angular momentum mode generator 3 and the first port 501 of the optical fiber circulator 5 and the second polarization controller 7 on the vortex optical fiber 8 jointly control polarization states of the pump light and Brillouin pump light to obtain a maximum Brillouin nonlinear gain. Since connecting fibers in the annular cavity are all vortex optical fibers, stable transmission of the pump light of the orbital angular momentum mode and the generated reverse Stokes light of the orbital angular momentum mode is ensured. Based on the stimulated Brillouin scattering effect, the direct intracavity resonance amplification of the orbital angular momentum mode is realized, thus obtaining the optical vortex laser light with a high mode purity.

The above embodiments are the preferred embodiments of the present invention, but the embodiments of the present invention are not limited by the above embodiments. Any other changes, modifications, substitutions, combinations, and simplifications made without departing from the spirit and principle of the present invention shall be equivalent substitute modes, and shall fall within the scope of protection of the present invention.

What is claimed is:

1. An all-fiber optical vortex laser based on resonance of orbital angular momentum modes, wherein the laser comprises a narrow-linewidth pump laser, an optical amplifier, an orbital angular momentum mode generator, a first polarization controller, an optical fiber circulator, an optical fiber coupler, a second polarization controller and a vortex optical fiber;
the orbital angular momentum mode generator comprises a first port, a second port, a third port and a fourth port;
the optical fiber circulator comprises a first port, a second port and a third port;
the optical fiber coupler comprises a first port, a second port, a third port and a fourth port; and
the narrow-linewidth pump laser is connected to the optical amplifier; the optical amplifier is connected to the first port of the orbital angular momentum mode generator, and the second port of the orbital angular momentum mode generator is connected to the first port of the optical fiber circulator via the first polarization controller; the second port of the optical fiber circulator is connected to the first port of the optical fiber coupler; the second port of the optical fiber coupler is connected to the third port of the optical fiber circulator via the second polarization controller and the vortex optical fiber to form an annular cavity; and the third port of the optical fiber coupler outputs laser light.

2. The all-fiber optical vortex laser based on the resonance of the orbital angular momentum modes according to claim 1, wherein a narrow-linewidth semiconductor laser or a narrow-linewidth optical fiber laser is used as the narrow-linewidth pump laser, which has a linewidth lower than 1 MHz, and is operated in a single longitudinal mode.

3. The all-fiber optical vortex laser based on the resonance of the orbital angular momentum modes according to claim 1, wherein a high-gain rare earth ion-doped optical fiber amplifier or a semiconductor optical amplifier is used as the optical amplifier.

4. The all-fiber optical vortex laser based on the resonance of the orbital angular momentum modes according to claim 1, wherein the orbital angular momentum mode generator is a 2×2 mode selection coupler made by fused biconical tapering of a single-mode optical fiber and a vortex optical fiber, thus realizing directional selection coupling between a fundamental transverse mode in the single-mode fiber and an orbital angular momentum mode with a specific topological charge in the vortex optical fiber, the first and fourth ports are single-mode optical fibers, and the second and third ports are vortex optical fibers.

5. The all-fiber optical vortex laser based on the resonance of the orbital angular momentum modes according to claim 1, wherein the optical fiber circulator is a circulator based on the vortex optical fiber, and tail optical fibers of the three ports are all vortex optical fibers.

6. The all-fiber optical vortex laser based on the resonance of the orbital angular momentum modes according to claim 1, wherein the optical fiber coupler is a 2×2 coupler made by fused biconical tapering of the vortex optical fibers, which is capable of realizing directional coupling between an orbital angular momentum mode in one vortex optical fiber and an orbital angular momentum mode with a same topological charge in another vortex optical fiber, and tail optical fibers of the four ports of the optical fiber coupler are all vortex optical fibers.

7. The all-fiber optical vortex laser based on the resonance of the orbital angular momentum modes according to claim 1, wherein the vortex optical fiber is an optical fiber supporting stable transmission of an orbital angular momentum mode in a corresponding wave band, more than two orbital angular momentum modes are supported, and a length of the vortex optical fiber is greater than 20 m.

* * * * *